No. 784,056. PATENTED MAR. 7, 1905.
W. A. LAYMAN.
ELECTRIC MOTOR.
APPLICATION FILED DEC. 28, 1903. RENEWED AUG. 25, 1904.

3 SHEETS—SHEET 1.

Witnesses
W. A. Alexander.
Fred Henke.

Inventor
Waldo. A. Layman.
By Attorneys

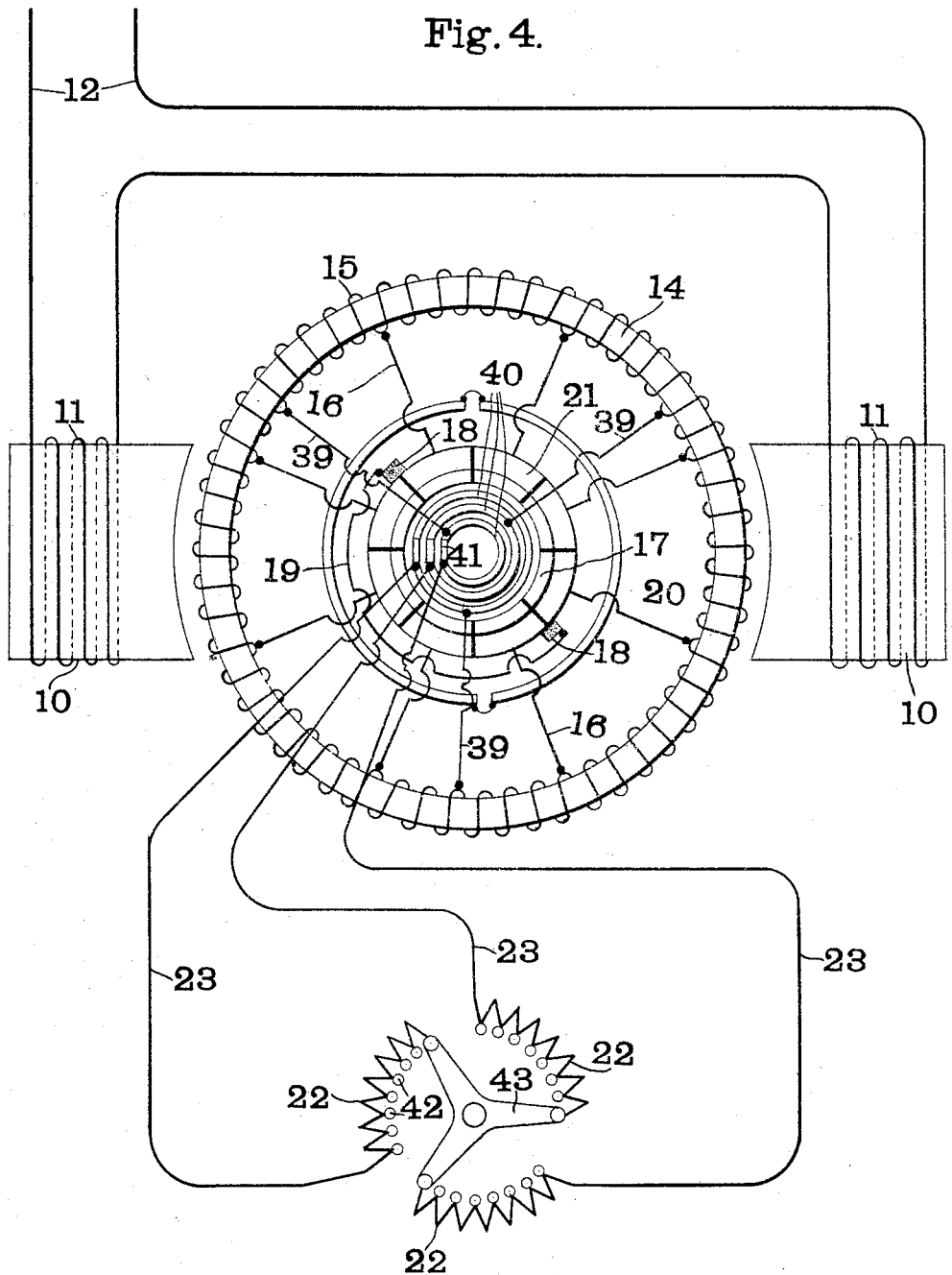

No. 784,056.

Patented March 7, 1905.

UNITED STATES PATENT OFFICE.

WALDO A. LAYMAN, OF ST. LOUIS, MISSOURI.

ELECTRIC MOTOR.

SPECIFICATION forming part of Letters Patent No. 784,056, dated March 7, 1905.

Application filed December 28, 1903. Renewed August 25, 1904. Serial No. 222,136.

*To all whom it may concern:*

Be it known that I, WALDO A. LAYMAN, a citizen of the United States, residing at the city of St. Louis, in the State of Missouri, have invented a certain new and useful Electric Motor, of which the following is such a full, clear, and exact description as will enable any one skilled in the art to which it appertains to make and use the same, reference being had to the accompanying drawings, forming part of this specification.

My invention relates to electric motors, and more particularly to that type of alternating-current motors in which the armature is provided with a circuit commuted at starting for producing definite armature-poles and with means, preferably automatic, for short-circuiting the individual coils of the armature after starting.

One object of my invention is to combine in an alternating-current motor the ability to operate at speeds below the normal running speed and at the same time to secure at normal speed the maximum output of which the windings are capable.

I provide the armature of my motor at normal running speed with a large number of short circuits, thus decreasing the resistance of the armature winding or windings and securing a motor of greater capacity than has heretofore been obtained in this type.

Figure 1:
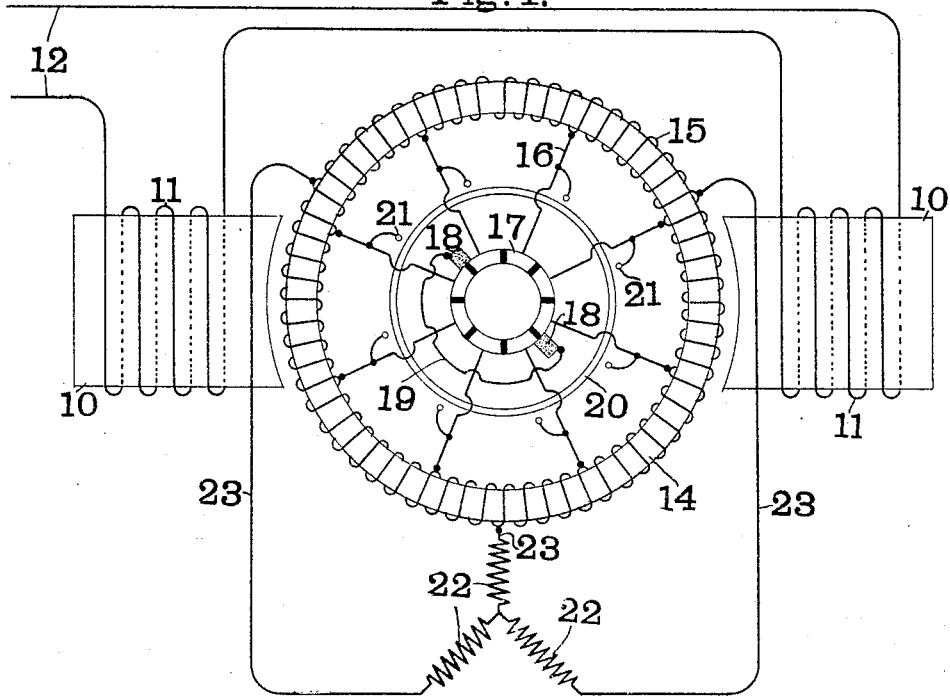
Figure 2:
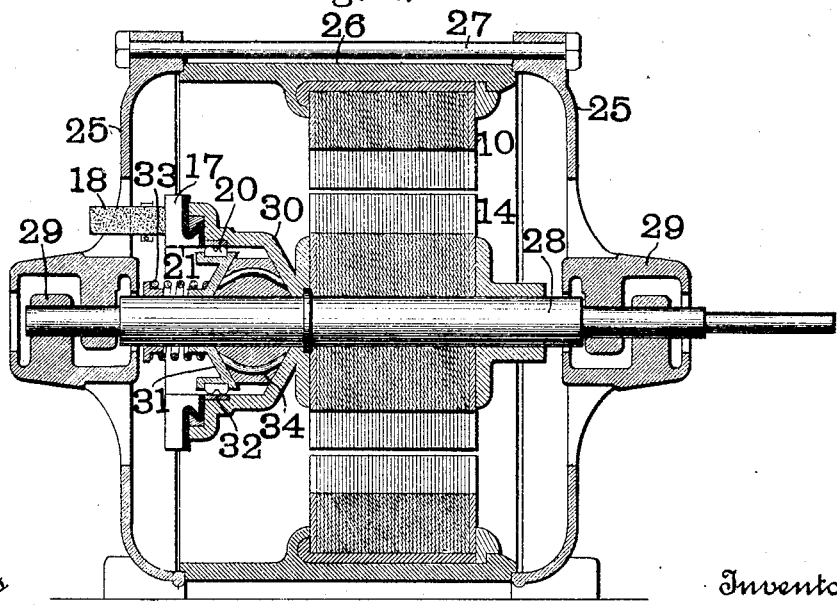
Figure 3:
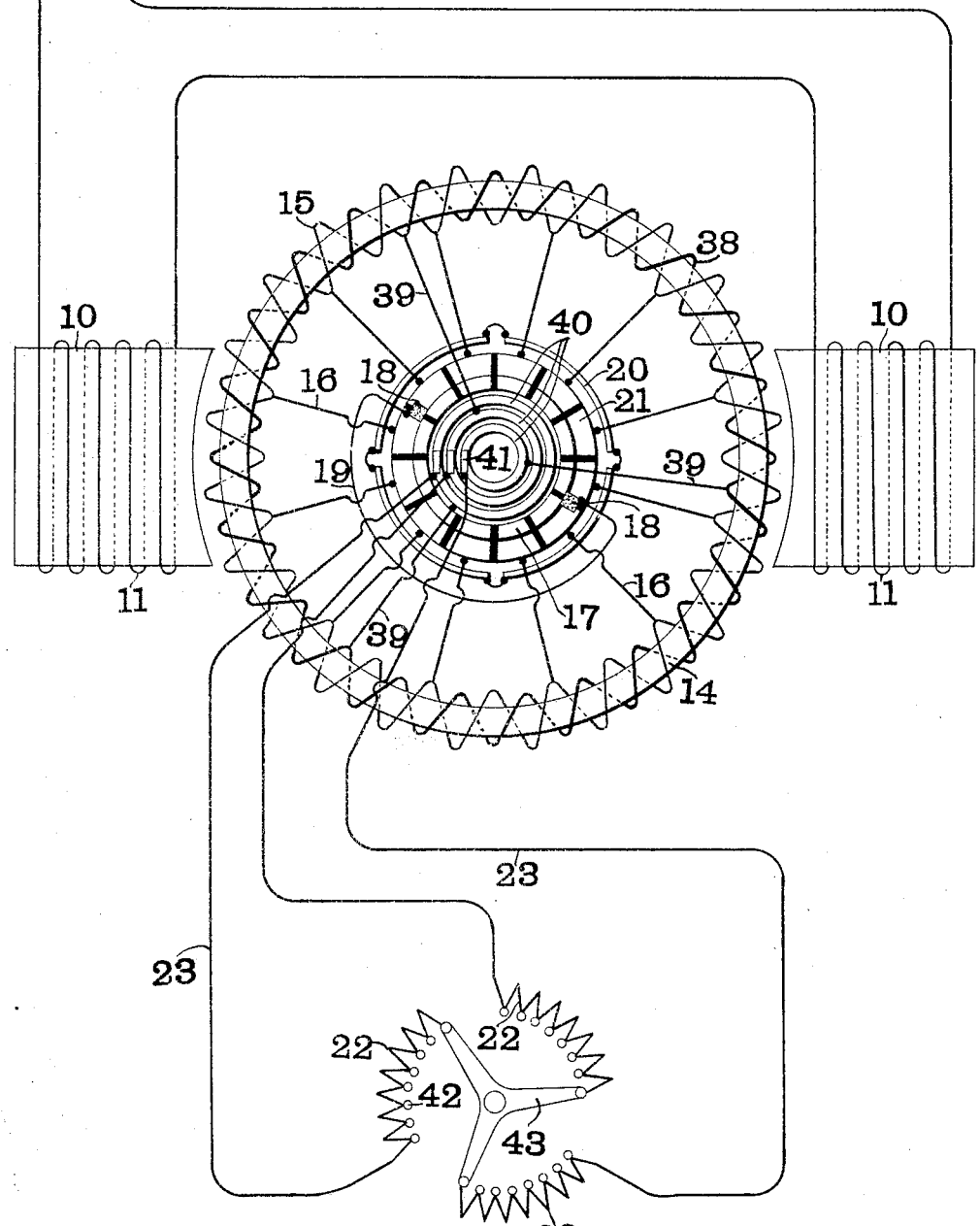

In the accompanying drawings, Figure 1 is a diagram showing the preferred form of my invention. Fig. 2 is a vertical section showing the mechanical construction of a motor to which my invention is applied, and Figs. 3 and 4 are diagrams showing certain modifications.

Like marks of reference refer to similar parts in the several views of the drawings.

10 represents the field-cores wound with field-coils 11. These field-coils 11 are supplied with single-phase alternating current from mains 12.

14 is the core of the armature supplied with suitable windings 15. These windings 15 are connected by means of leads 16 with commutator-segments 17. Bearing on the segments 17 are brushes 18, connected by a conductor 19.

20 is a contact-ring for short-circuiting the individual coils of the winding 15 by contact with terminals 21.

22 is a symmetrical three-part resistance which is connected to the winding 15 at equidistant points by means of leads 23, and thus placed in polyphase relation to the winding 15.

Referring now to Fig. 2, 25 represents the end castings and 26 the center casting of a motor embodying my invention. These castings are held together by means of bolts 27. The armature-core 14 is mounted upon a shaft 28, journaled in bearings 29 in the end castings 25. Mounted on the shaft 28 is a cup-shaped member 30, which carries the commutator-segments 17. In practice the inner ends of these commutator-segments 17 form the terminals 21. (Shown in Fig. 1.) Slidingly mounted on the shaft 28 within the cup-shaped member 30 is a member 31, which carries a number of contact-making devices corresponding to the contact-ring 20 of Fig. 1. When the motor is at rest, these contact pieces 20 rest upon a conducting-ring 32, carried in the cup-shaped member 30. The member 31 is held in its normal position by means of a coil-spring 33. The members 30 and 31 are beveled on their opposing faces and have placed between them wedge-shaped weights 34. After the motor has attained a predetermined speed the centrifugal action of the wedge-shaped weights 34 will force the member 31 along the shaft 28, and thus connect the various commutator-segments 17 with the conducting-ring 32, thus short-circuiting the individual coils of the armature.

In the modification shown in Fig. 3 the winding 15 is connected to the commutator-segments in the same manner as has been above described, and the individual coils are short-circuited in the same manner. The winding 15, however, is not connected to the resistance 22; but a separate winding 38 is provided which is connected, by means of leads 39, with slip rings 40. Bearing on these slip-rings 40 are contacts 41, to which are connected the leads 23 from the resistance 22. In this construction the resistance 22 is provided with contacts 42. These contacts coöperate with a three-armed switch 43, by means of which the resistance may be gradually cut out of circuit.

Referring now to Fig. 4, it will be seen that in the modification of my invention there shown the armature-core 14 is provided with but a single winding 15, similar to Fig. 1, instead of with two independent windings, as shown in Fig. 3, and that both the commutator 17 and the variable resistance 22 are connected in circuit with the winding 15. In operating this form of my motor, and referring particularly to Figs. 1 and 2, single-phase alternating current is fed to the field-coils 11 from the mains 12. This induces single-phase currents in the armature-coils 15. As these coils are commuted by a commutator 17 and brushes 18, the motor is self-starting, as is well known. In addition to the single-phase current in the armature-coils 15, however, polyphase currents will be induced, owing to the connection of the resistance 22 in polyphase relation with the said coils, and these polyphase currents aid in starting the motor. This resistance may be varied, if desired, as hereinafter described. After the motor has reached speed the individual coils of the circuit 15 will be automatically short-circuited by the contact-ring 20 and the motor will continue to run at normal speed under load. In the modification shown in Fig. 3 the resistance 22 is contained in a separate circuit. In this construction after the armature has reached speed the resistance 22 may be gradually cut out by means of the three-armed switch 43. It is evident that by varying the amount of the resistance 22, included in the armature circuit or circuits, the speed of the motor, when running below normal, may be varied at will. As the modification shown in Fig. 4 differs from that of Fig. 3 only in that the armature of Fig. 4 is provided with but a single winding, it is thought that its operation will be obvious from the above.

Having fully described my invention, what I claim as new, and desire to secure by Letters Patent of the United States, is—

1. The combination with one of the members of an alternating-current motor, of a conductor connected at a plurality of points to said member to form a short circuit therefor, a second conductor connected to said member, means for determining the position of the poles of said member, and means for short-circuiting said second conductor.

2. The combination with one of the members of an alternating-current motor, of a conductor containing a resistance and connected at a plurality of points to said member to form a short circuit therefor, a second conductor connected to said member, means for determining the position of the poles of said member, and means for short-circuiting said second conductor.

3. The combination with one of the members of an alternating-current motor, of a conductor containing a variable resistance and connected at a plurality of points to said member to form a short circuit therefor, a second conductor connected to said member, means for determining the position of the poles of said member, and means for short-circuiting said second conductor.

4. The combination with one of the members of an alternating-current motor, of a winding therefor, a conductor connected at a plurality of points to said winding to form a short circuit therefor, a second conductor connected to said winding, means connected with said second conductor for determining the position of the poles of said member, and means for short-circuiting said winding.

5. The combination with one of the members of an alternating-current motor, of a conductor connected in polyphase relation thereto to form a short circuit therefor, a second conductor for said member, means for determining the position of the poles of said member, and means for short-circuiting said second conductor.

6. In an electric motor, the combination with field-coils, of an armature having a commuted circuit at starting, a resistance connected in polyphase relation to said armature, and means in addition to said polyphase connections for short-circuiting individual coils of the armature after starting.

7. In an electric motor, the combination with field-coils, of an armature having a commuted circuit at starting, a resistance connected in polyphase relation to said armature, and automatic means for short-circuiting individual coils of the armature after starting.

8. In an electric motor, the combination with field-coils, of an armature having a commuted circuit at starting, a resistance connected in polyphase relation to said armature, and means for short-circuiting individual coils of said commuted circuit after starting.

9. In an electric motor, the combination with field-coils, of an armature having commuted circuit at starting, a resistance connected in polyphase relation to said armature, and automatic means for short-circuiting the individual coils of said commuted circuit after starting.

10. In an electric motor, the combination with field-coils, of an armature having a commuted circuit at starting, a resistance connected in polyphase relation to said commuted circuit, and means for short-circuiting the individual coils of said commuted circuit after starting.

11. In an electric motor, the combination with field-coils, of an armature having a commuted circuit at starting, a resistance connected in polyphase relation to said commuted circuit, and means for automatically short-circuiting the individual coils of said commuted circuit after starting.

12. In an alternating-current motor, the combination of field-coils, of an armature having a commuted circuit at starting, a variable resistance connected in polyphase relation to said armature, and means in addition to the polyphase connections for short-circuiting individual coils of the armature after starting.

13. In an alternating-current motor, the combination with field-coils, of an armature having a commuted circuit at starting, a variable resistance connected in polyphase relation to said commuted circuit, and means in addition to the polyphase connections for short-circuiting individual coils of the armature after starting.

14. In an alternating-current motor, the combination with field-coils, of an armature having a commuted circuit at starting, a variable resistance connected in polyphase relation to said armature, and automatic means for short-circuiting individual coils of the armature, when the motor attains a predetermined speed.

In testimony whereof I have hereunto set my hand and affixed my seal in the presence of the two subscribing witnesses.

W. A. LAYMAN. [L. S.]

Witnesses:
 JAMES H. BRYSON,
 D. O. BETJEMAN.